United States Patent
Urso, III et al.

(10) Patent No.: US 6,209,429 B1
(45) Date of Patent: Apr. 3, 2001

(54) MACHINING HOLLOW CYLINDERS

(75) Inventors: Charles J. Urso, III, Webster; Thomas M. Wilbert, Wolcott; Charles R. VanCassele, Honeoye; James A. Hirliman, Macedon; Michael A. McManus, Webster; Garry O. Glanzel, Wolcott; Richard B. Duong, Webster; Sidney L. McCoy, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/344,862

(22) Filed: Jun. 28, 1999

(51) Int. Cl.$^7$ ..................................... B23B 1/00
(52) U.S. Cl. .................. 82/1.11; 82/50; 82/52; 82/901
(58) Field of Search ................. 82/1.11, 50, 52, 82/113, 138, 901; 407/11, 118, 119; 408/58, 57, 59, 60

(56) References Cited

U.S. PATENT DOCUMENTS

| | | | |
|---|---|---|---|
| 3,141,746 | 7/1964 | DeLai | 51/307 |
| 3,545,321 | * 12/1970 | Phelps et al. | 82/52 X |
| 3,745,623 | 7/1973 | Wentorf, Jr. et al. | 29/95 B |
| 4,825,736 | * 5/1989 | Catanese | 82/901 |
| 4,884,476 | * 12/1989 | Okuzumi et al. | 76/407 |
| 4,921,375 | * 5/1990 | Famulari | 408/58 X |
| 5,560,270 | * 10/1996 | Caldana | 82/901 X |
| 5,670,290 | 9/1997 | Manzolati | 430/125 |
| 5,733,074 | * 3/1998 | Stock et al. | 408/17 |
| 5,778,744 | * 7/1998 | Braun et al. | 82/1.11 |
| 5,904,082 | * 5/1999 | Link et al. | 82/129 |
| 6,053,083 | * 4/2000 | Mosey | 82/1.11 |

FOREIGN PATENT DOCUMENTS

| | | | |
|---|---|---|---|
| 0092007 | * 4/1989 | (JP) | 82/901 |
| 404111705 | * 4/1992 | (JP) | 82/901 |

OTHER PUBLICATIONS

GE Superabrasive, Compax Diamond Tool Blanks, General Electrical Company, Technical Publication.
SYNDITE CTH 025, De Beers Industrial Diamond Division, Technical Publication.
SYNDITE CTB 010, De Beers Industrial Diamond Division, Technical Publication.
SYNDITE, Polycrystalline Diamond (PCD) Composite Material Backed With Cemented Tungsten Carbide, Technical Sheet.

* cited by examiner

Primary Examiner—Henry Tsai
(74) Attorney, Agent, or Firm—John L. Haack; Peter Kondo

(57) ABSTRACT

A process including providing a hollow cylindrical substrate, the substrate having a dry outer surface describing a curvilinear plane, a dry inner surface describing a curvilinear plane, a first end opposite a second end, and an imaginary axis extending from the first end to the second end, supporting the substrate, machining at least a portion of at least one end of the substrate with at least one dry polycrystalline diamond cutting tool in the absence of liquids to remove material from the substrate, and simultaneously maintaining, during machining, the dry inner surface of the cylindrical substrate free of the material machined from the at least one end of the substrate by the at least one dry polycrystalline diamond cutting tool.

17 Claims, 6 Drawing Sheets

MACHINING HOLLOW CYLINDERS

BACKGROUND OF THE INVENTION

This invention relates in general to processing drums and more specifically, to a process for machining hollow cylinders.

In the art of electrophotography an electrophotographic imaging member comprising a photoconductive insulating layer on a conductive layer is imaged by first uniformly electrostatically charging the imaging surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided electrostatically attractable toner particles on the surface of the photoconductive insulating layer. The resulting visible toner image can be transferred to a suitable receiving member such as paper. This imaging process may be repeated many times with reusable photoconductive insulating layers.

Electrophotographic imaging members having a drum configuration are usually multilayered photoreceptors that comprise a rigid hollow rigid cylindrical substrate having a conductive layer, an optional hole blocking layer, a charge generating layer, and a charge transport layer. These layers are usually formed by a coating process such as dip coating or spraying. Excellent toner images may be obtained with these multilayered drum photoreceptors.

During image cycling in a copier, printer or duplicator, the outer surface including the ends of the drums must meet critical tolerance requirements to avoid contact with closely spaced devices such as charging and developing applicator rolls. Accidental contact with these closely spaced devices form undesirable grooves that degrade images formed during image cycling.

These drums are usually supported with the aid of end caps which are mounted at each end of the drum. The end caps are, in turn, supported for rotation by any suitable device such as a shaft extending through the end caps or by molded-in or machined shafts extending out from the centerline of the caps. These shafts are supported by any suitable member of a machine frame. The shafts may be fixed to the machine frame and stationary with the drum rotating around the shaft or may be fixed to the end caps for rotation with the drum. Since the drums are normally formed by extrusion processes, they have imperfect dimensions and require machining to meet the high tolerance requirements of precision devices. Machining may involve removal of material from the inside surface of the ends of the drum to facilitate precise positioning of the end caps; cutting of the ends of the drums to achieve the required drum length; and/or chamfering of the ends of the drum to promote installation of the end caps. In subsequent operations, the outside surface of the drum is usually lathed to ensure roundness, avoid conicity and form a mirror finish.

Thus, in modern imaging systems, the tolerance requirements for drum to charger or applicator roll spacings are extremely high to avoid poor image quality characteristics.

Machining of the end of a hollow metal cylinder or drum to alter length or to chamfer is well known and involves mounting the cylinder in a holder and bringing a spindle carrying a rotatable cutting head into contact with the end of the drum. The cutting head carries at least one cutting tool. Preferably, the rotatable cutting head is rotated by a high precision electric motor free of vibrations. While the cutting head is being rotated, an edge of the cutting tool is brought into contact with one end of the stationary drum to remove material from the drum. The edge of the cutting tool is moved completely around the end of the drum by the rotating cutting head to remove material from the drum end for drum length alteration, and/or to form a chamfer (bevel), and/or to bore the inner surface of the drum at the end of the drum. The cutting tool is normally incremented in relationship to the end of the drum by movement of the rotating head toward the drum in a direction parallel to the imaginary axis of the drum. Thus, the end cutting, chamfering and boring may be accomplished simultaneously or in separate sequential cutting operations.

This machining of predetermined portions of the ends of drums is usually accomplished manually with the rotating cutting tool continuously bathed with an expensive cutting liquid. The cutting tool is usually a carbide tool. This carbide tool requires frequent sharpening. Resharpening requires shut down of the machining operation, removal of the carbide tool, sharpening of the tool, and reinstallation of the tool. Because of the mist and chips produced during machining, the apparatus must be enclosed in a housing to prevent cutting fluid mist from contaminating other operations or soaking the machine operator. For operator access, the housing is usually fitted with a safety door. Although the cutting liquid helps remove chips from the drum and cutting tool, reduces surface tearing, and cools the cutting bit and drum during machining, operators must continuously remove large amounts of chips that have adhered to or become tangled around the cutting tool as well as other chips which accumulate in the work area. This accumulation creates premature component failure in subsequent processing operations. In addition, some of the chips and cutting liquid deposit on the interior surface of the hollow drum. Loading and unloading of drums from the machining fixture for every machining cycle requires opening and closing of the door in the machining apparatus housing and manual mounting and dismounting of the drums from the machining fixture. This activity often presents safety and ergonomic concerns such as repetitive motion disabilities, e.g. tendonitous. Moreover, frequent contact between airborne cutting liquid mist and the operator often leads to dermatitis. Further, spillage of cutting liquids on the floor adjacent the machining devices pose additional safety issues. After subjecting the drum to a chamfering and/or end cutting operation, the cutting liquid and chips must be washed off the interior and exterior surfaces of the drum with hot water and allowed to dry before the substrate can be lathed to form a mirror surface on the exterior of the drum. The lengthy drying takes place at ambient temperature and requires up to about 24 hours. If the cutting liquid and chips from the end cutting and chamfering operations are not removed from the interior of the drum, they contaminate coating baths during subsequent coating operations. The contaminated coating baths lead to defects in the deposited coatings and coating operation shut down is necessary to replace the contaminated coating material.

Foam dampening plugs are inserted in interior of the substrates prior to the lathing operation. Since the drum is usually very thin, lathing of a drum without a foam rubber dampening plug causes the drum to vibrate during lathing thereby causing the formation of a "barber pole" pattern which adversely affects electrophotographic images formed on the final drum. These dampening plugs are not compatible with a wet or damp surface because they swell upon exposure to the cutting liquid present on the interior surface of the drum and cannot subsequently be inserted into the interior of fresh drums to be lathed because the swollen outside diameter of the plug has become greater than the inside diameter of the drum. Also, repeated exposure to cutting liquid and chips causes deterioration of the dampening plug material. Thus, the cutting liquid and chips must be 1 washed off the interior and exterior surfaces of the drum with hot water and allowed to dry before the substrate can be lathed. Substrate drying time can require up to 24 hours. Further, if material is removed from a drum substrate by a machining processes using a cutting liquid, the handling and disposal of the liquid presents difficulties from the environmental impact point of view. Also, liquid removal processes require elaborate and expensive equipment and are time intensive. Thus, these liquid removal and cleaning techniques fail to provide satisfactory photoreceptor substrates. Moreover, throughput of the product of the aforesaid processes is undesirably low.

INFORMATION DISCLOSURE STATEMENT

U.S. Pat. No. 5,670,290 issued to R. Manzolati on Sep. 23, 1997—A reclaiming process is disclosed including providing a drum including a hollow cylindrical substrate coated with at least one electrophotographic imaging layer, the substrate having an outer surface describing a curvilinear plane, removing the imaging layer, and removing material from the substrate to a radial distance between about 10 micrometers and about 400 micrometers from the curvilinear plane to form a reclaimed substrate having a total indicated run out variation mean of less than about 160 micrometers and which is free of distortions visible to the naked eye.

U.S. Pat. No. 3,745,623 issued to R. Wentorf, Jr. et al. on Jul. 17, 1973—Diamond tools and superpressure processes for the preparation thereof are described wherein the diamond content is present either in the form of a mass comprising diamond crystals bonded to each other or of a thin skin of diamond crystals bonded to each other. In each instance the diamond content is supported on and directly bonded to an extremely stiff sintered carbide substrate in order to provide mechanical support therefor to more effectively utilize the high elastic modulus of the diamond.

U.S. Pat. No. 3,141,746 to DeLai on Jul. 21, 1964—A process is described, which, in one form, comprises mixing diamond powder together with specific metal powders, placing the powders in a high pressure high temperature apparatus and subjecting the mixture to a pressure and temperature lying within a diamond stable region but close to the graphitization point of diamond at the given pressures so as to form cemented diamond compacts.

GE Superabrasives, Compax Diamond Tool Blanks, General Electric Company, Technical Publication—Compax polycrystalline diamond tool blanks are described.

SYNDITE CTH 025, De Beers Industrial Diamond Division, Technical Publication, A grade of polycrystalline diamond for higher speed machining and dry machining of workpieces such as non-ferrous metals is disclosed.

SYNDITE CTB 010, De Beers Industrial Diamond Division Technical Publication—Discs of Syndite CTB 010 are disclosed for manufacture of tools with long cutting edges.

SYNDITE, Polycrystalline Diamond (PCD) Composite Material Backed With Cemented Tungsten Carbide, Technical Sheet—Grades 002, 010 and 025 of Syndite for applications such as a brazeable insert for machining non-ferrous materials are disclosed.

Thus, techniques for the machining of hollow cylindrical members exhibit deficiencies which fail to satisfy the many high tolerance and throughput requirements of drums for sophisticated automatic, cycling imaging and other precision systems.

SUMMARY OF THE INVENTION

It is an object of this invention to provide a process for machining hollow cylinders which overcomes the above-noted disadvantage.

It is another object of this invention to provide a dry process for machining hollow cylinders in a liquid free environment.

It is yet another object of this invention to provide a process for machining hollow cylinders which meet high tolerance requirements.

It is still another object of this invention to provide a process for precisely machining hollow cylinders for electrophotographic imaging members, developer applicator rollers, charging devices, transfer devices and the like.

It is another objection of this invention to provide a more economical process for machining hollow cylinders.

It is yet another objection of this invention to provide a safer process for machining hollow cylinders.

It is still another objection of this invention to provide a more ergonomic process for machining hollow cylinders.

It is another objection of this invention to provide a higher throughput process for machining hollow cylinders.

It is yet another objection of this invention to provide a cleaner process for machining hollow cylinders.

It is another objection of this invention to provide a process for machining hollow cylinders which maintains the interior of hollow cylinders free of chips and liquids during machining.

The foregoing objects and others are accomplished in accordance with this invention by a process comprising providing a hollow cylindrical substrate, the substrate having a dry outer surface describing a curvilinear plane, a dry inner surface describing a curvilinear plane, a first end opposite a second end, and an imaginary axis extending from the first end to the second end, supporting the substrate, machining at least a portion of at least one end of the substrate with at least one dry polycrystalline diamond cutting tool in the absence of liquids to remove material from the substrate, and simultaneously maintaining, during machining, the dry inner surface of the cylindrical substrate free of the material machined from the at least one end of the substrate by the at least one dry polycrystalline diamond cutting tool.

The machined substrate may subsequently be used in high tolerance devices such as electrophotographic imaging members, developer applicator rollers, charging devices, transfer devices and the like.

DESCRIPTION OF THE DRAWINGS

A more complete understanding of the present invention can be obtained by reference to the accompanying drawings wherein.

Figure 1:
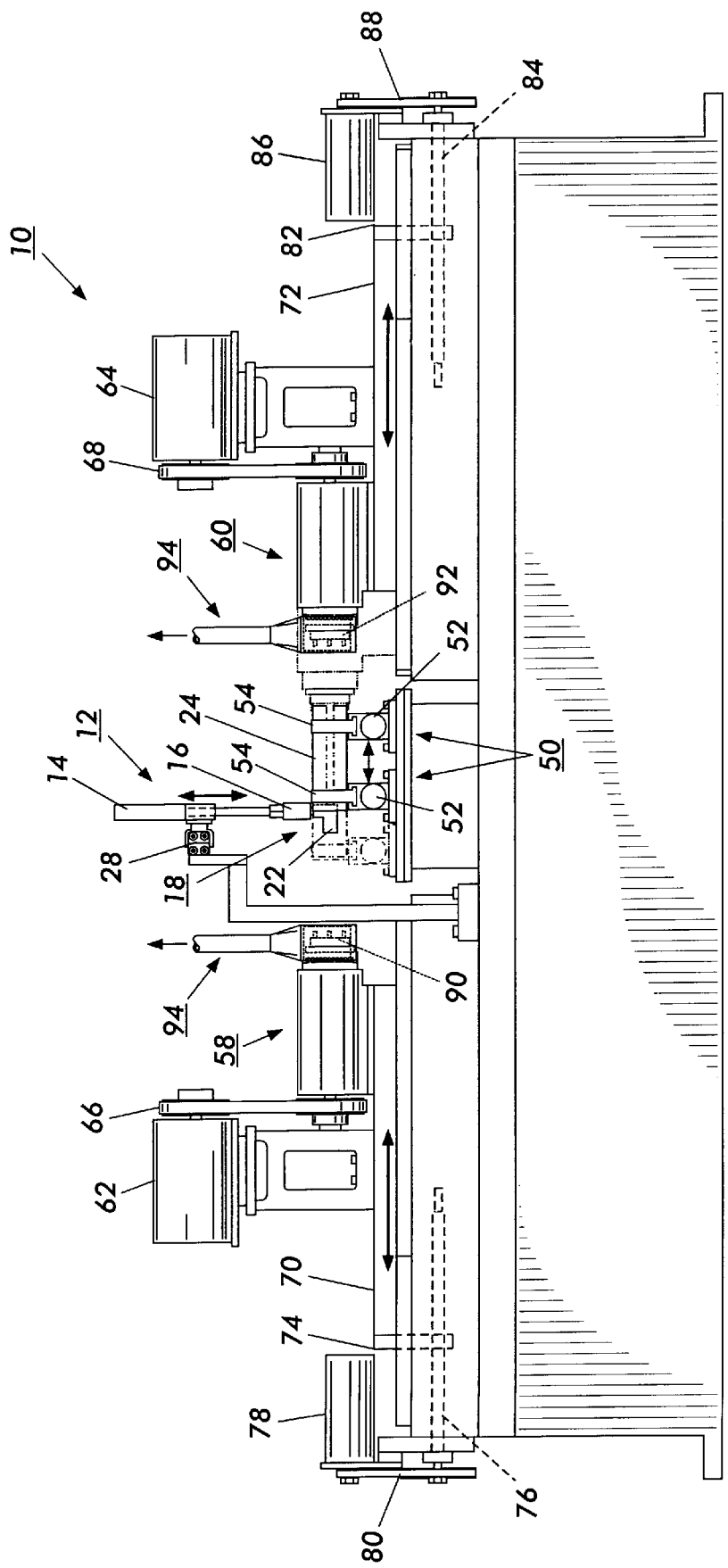
FIG. 1 is a partial schematic illustration in elevation of a machining apparatus of this invention for machining the ends of a cylindrical substrate.

These figures merely schematically illustrate the invention and are not intended to indicate relative size and dimensions of the device or components thereof.

DETAILED DESCRIPTION OF THE DRAWING

Referring to FIGS. 1, 2, 3, and 4 a machining apparatus 10 of this invention is illustrated comprising pick and place devices 12 and 13 supporting vertical two way acting pneumatic cylinders 14 and 15, respectively, and reciprocatable picks 16 and 17, respectively. Picks 16 and 17 comprise grippers 18 and 19, respectively. Pneumatic cylinders 14 and 15 support pick 16 and 17, respectively, for vertical motion. Grippers 18 comprise opposing exchangeable clamps 20 or 22, each of which has an arcuate shaped surface which corresponds to and mates with the arcuate outer surface of hollow drum 24 or drum 26 (only half of drums 24 and 26 shown in FIGS. 2 and 4) when horizontal pneumatic cylinders (not shown) supporting opposing clamps 20 or 22 have been activated to advance the clamps toward and into contact with drum 24 or 26, respectively. Grippers 19 comprise opposing exchangeable clamps 21 or 23, each of which has an arcuate shaped surface which corresponds to and mates with the arcuate outer surface of hollow drum 25 or drum 27 (only half of drums 25 and 27 shown in FIG. 4) when horizontal pneumatic cylinders (not shown) supporting opposing clamps 21 or 23 have been activated to advance the clamps toward and into contact with drum 24 or 26, respectively. The horizontal pneumatic cylinders (not shown) are located in gripper 18 adjacent to and supporting opposing clamps 20 and 22. For purposes of illustration in FIGS. 2 and 4, the arcuate shaped surface for clamp 20 has a greater radius of curvature than that for clamp 22 to show that different size clamps can be used to accommodate different diameter drums in different machining runs. Normally, clamp 20 would be opposite a clamp having a mirror image arcuate shaped surface with an identical radius of curvature or clamp 22 would be opposite a clamp having a mirror image arcuate shaped surface with an identical radius of curvature, the curvature matching the curvature of outer surface of the drum.

Reciprocatable picks 16 and 17 are supported for horizontal reciprocatable motion on horizontal two way acting pneumatic traverse cylinder 28. The horizontal two way acting pneumatic traverse cylinder 28 transports pick 16 from a loading station to a machining station and simultaneously transports pick 17 from the machining station to a discharge station. Pick 16 is shown at the loading station in FIG. 2 and at the machining station in FIG. 4. Pick 17 is shown at the discharge station in FIG. 4.

Figure 2:
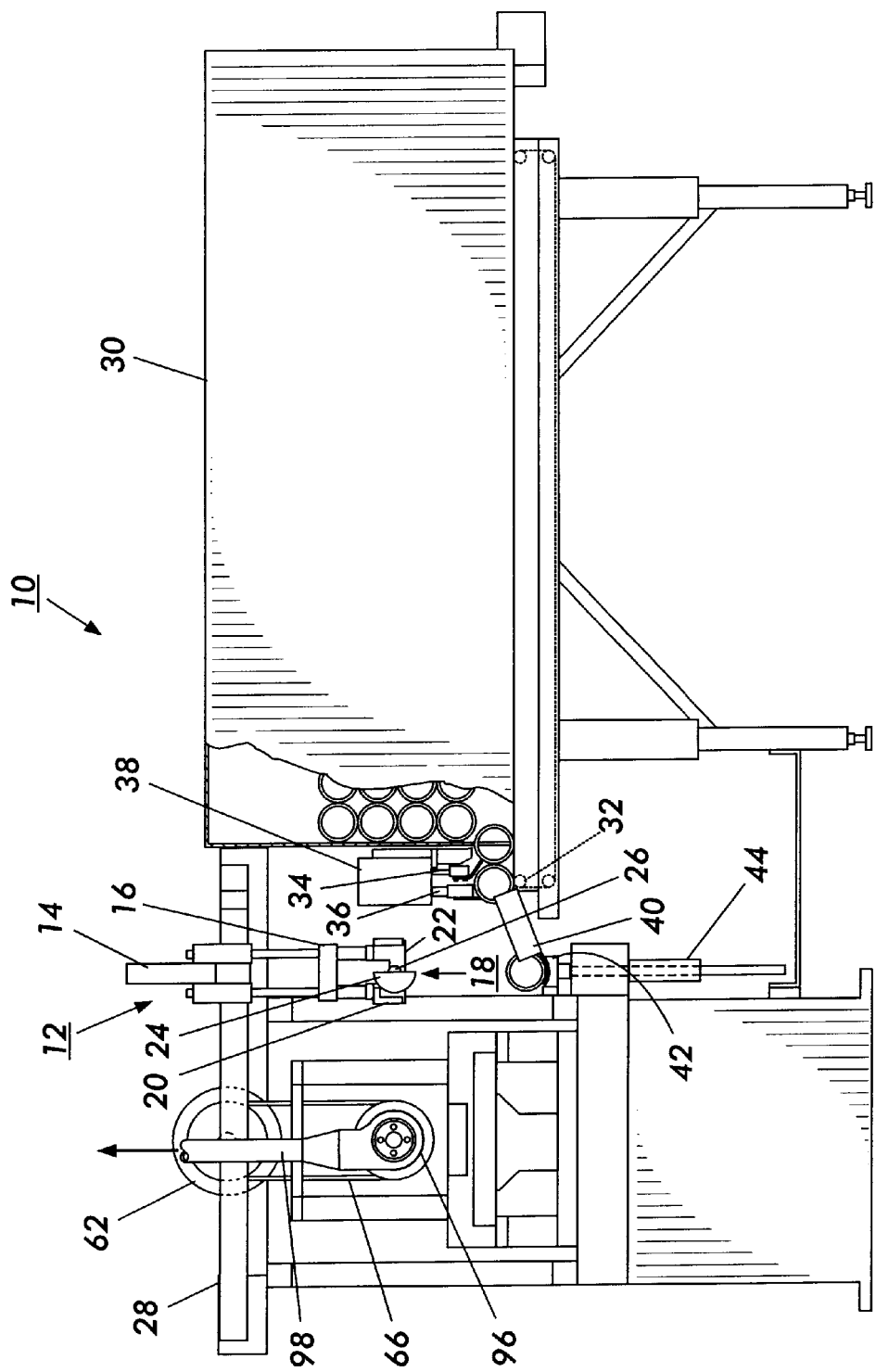
FIG. 2 is a partial schematic end view of the machining apparatus shown in FIG. 1.
Figure 3:
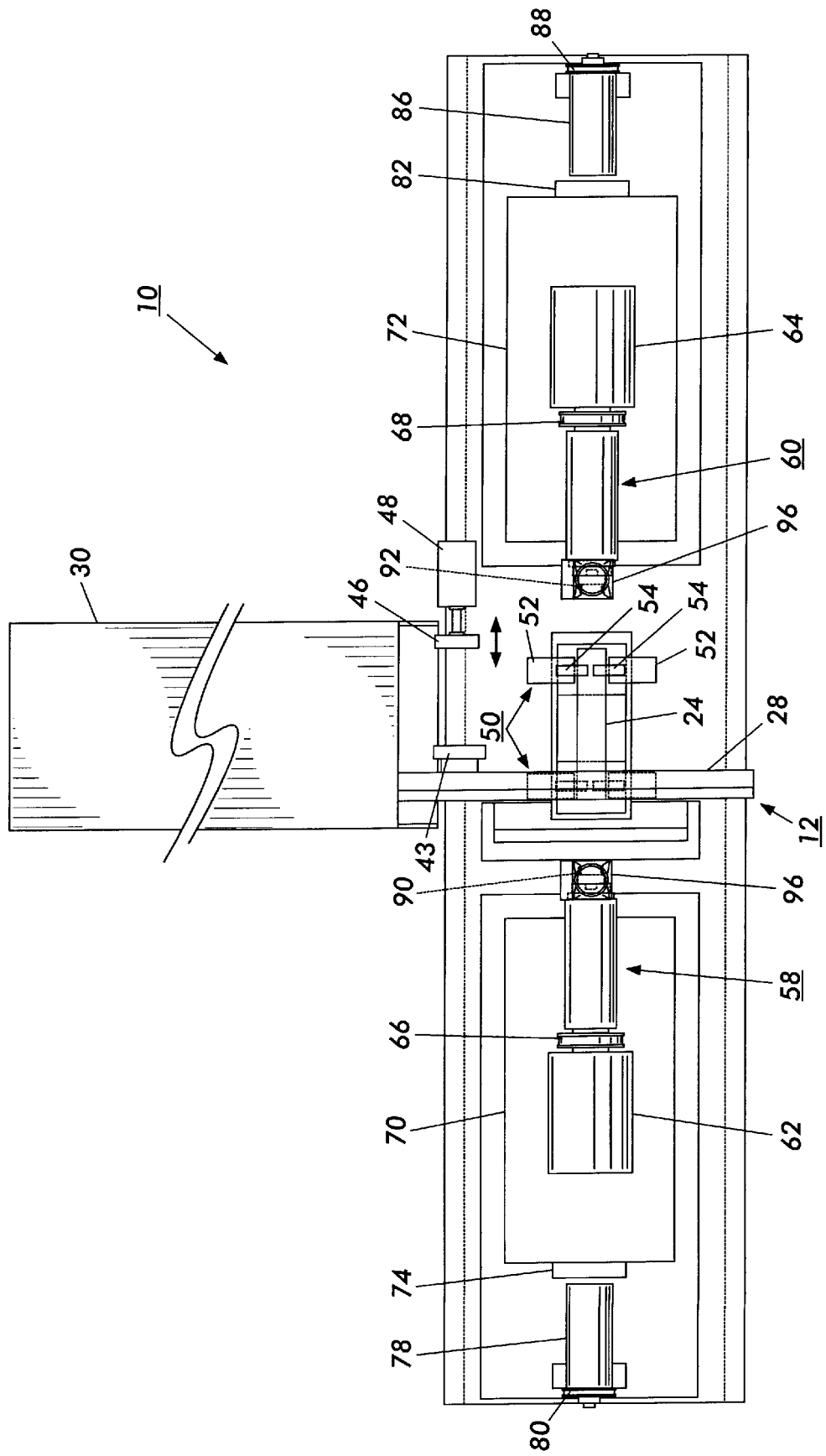
FIG. 3 is a partial schematic plan view of the machining apparatus shown in FIGS. 1 and 2.
Figure 4:
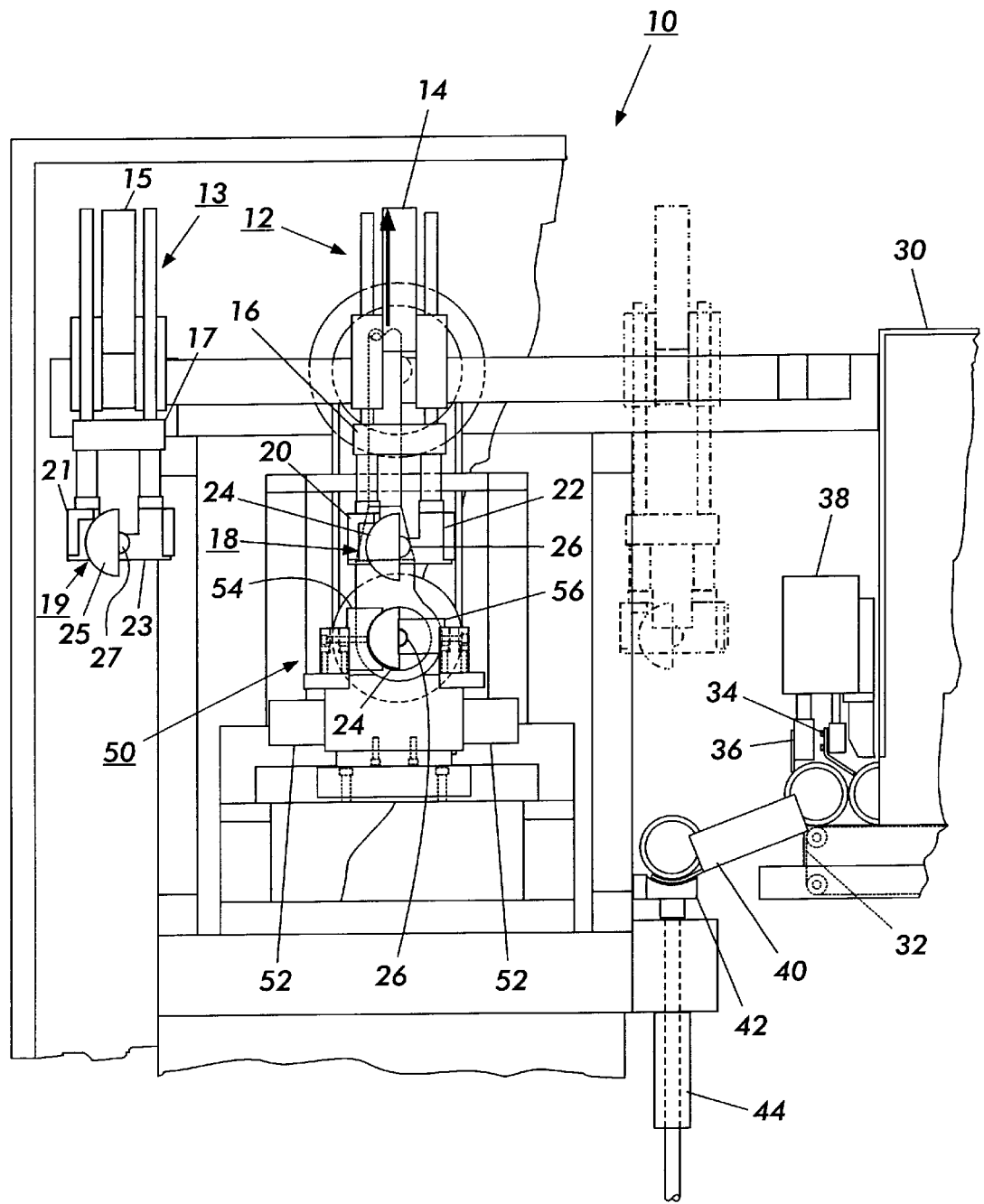
FIG. 4 is a partial schematic cross sectional view of the machining apparatus shown in FIG. 2.

As illustrated in FIGS. 2, 3 and 4, hopper 30 feeds fresh drums using a conveyor belt 32 to a first escapement gate 34 and thereafter to a second escapement gate 36. The walls of hopper 30 may be adjustable to accommodate different length drums. These escapement gates are independently vertically reciprocatable by two way acting pneumatic cylinders located in housing 38. The height of gates are adjustable to accommodate different diameter drums for different machining runs. A conventional staging proximity switch (not shown) is positioned at any suitable location below second escapement gate 36 to detect the arrival of a fresh drum from hopper 30 for processing. When a fresh drum arrives at the second escapement gate 36 (shown in the down position in FIGS. 2 and 4), the arriving drum activates the proximity switch which activates a pneumatic cylinder in housing 38 to lower first escapement gate 34 and second escapement gate 36 is thereafter raised by activation of another pneumatic cylinder (not shown) in housing 38. Raising of second escapement gate 36 allows the fresh drum, which was restrained by second escapement gate 36, to roll by gravity down inclined ramp 40 to a loading station comprising lifting cradle 42. Lifting cradle 42 is raised and lowered by two way acting air cylinder 44 which in turn is supported by the frame of machining apparatus 10. A conventional proximity switch (not shown) is positioned at lifting cradle 42 to detect the arrival of a fresh drum. Pneumatic cylinder 44 is then activated to lift lifting cradle 42, which in turn, raises a fresh drum upwardly toward grippers 18 comprising a pair of opposing clamps 20 (only one is shown because the other clamp 22 is shown to illustrate exchangeability of the clamps for different diameter drums), the clamps being held in the open position by inactivated horizontal conventional two way acting pneumatic cylinders (not shown) supporting opposing clamps 20 or 22. A positioner 46 (see FIG. 3) is employed to position the drum on the cradle 42 by horizontally pushing one end of the drum toward a stationary stop 43 located at the opposite end of the cradle 42 and supported by the frame of machining apparatus 10. Positioner 46 is supported by two way acting pneumatic cylinder 48. Activation of two way acting pneumatic cylinder 48 pushes the drum against the stop 43. Reciprocatable pick 16 is positioned above cradle 42 by activation of horizontal two way acting pneumatic traverse cylinder 28. Activation of pneumatic cylinder 14 lowers reciprocatable pick 16 to position opposing clamps 20 of gripper 18 along each side of the raised drum. The horizontal pneumatic cylinders (not shown) supporting opposing clamps 20 are activated to bring opposing clamps 20 against the drum supported by raised cradle 42 thereby clamping or gripping the drum. Pneumatic cylinder 48 is inactivated to retract positioner 46. Air cylinder 14 is inactivated to raise pick 16 and pneumatic cylinder 44 is inactivated to lower cradle 42.

Pneumatic traverse cylinder 28 is activated to horizontally move reciprocatable pick 16 over at a machining station and to simultaneously move reciprocatable pick 17 to a discharge station (located below pick 17 in FIG. 4). Each clamping vise 50 comprises a pair of opposed two way acting pneumatic cylinders 52 which support opposing jaws 54 or 56 (only one of jaw 54 is shown in FIG. 4 because the other jaw 56 is shown to illustrate exchangeability of the jaws for different diameter drums). One or both clamping vises 50 may be moved to different locations (see phantom location in FIG. 1) in a direction parallel to the axis of the drum to better accommodate different length drums. With jaws 54 of clamping vises 50 in the open position because of inactivation of pneumatic cylinders 52, pneumatic cylinder 14 is activated to lower pick 16 to position the fresh drum between opposing jaws 54. Pneumatic cylinders 52 are activated to move jaws 54 into contact with the lowered drum. The horizontal pneumatic cylinders (not shown) supporting opposing clamps 20 of pick 16 are inactivated to withdraw opposing clamps 20 away from the drum and pneumatic cylinder 14 is inactivated to retract pick 16 to an up position (see FIG. 4).

Pneumatic traverse cylinder 28 is inactivated to horizontally move reciprocatable pick 16 from the machining station to the loading station and to simultaneously move reciprocatable pick 17 from the discharge station to the machining station. This operation positions pick 16 for picking up a fresh drum and positions pick 17 for picking up a machined drum.

As illustrated in FIG. 3, retractable spindles 58 and 60 are initially located adjacent, but spaced from, each end of the drum held by jaws 54. Spindles 58 and 60 are driven by electric motors 62 and 64, respectively, through drive belts 66 and 68, respectively. Any suitable spindle may be employed such as, for example, Gilman Spindles. The spindles and drive motors are mounted on horizontally slideable platforms 70 and 72. Any suitable sliding platform may be utilized. Typical sliding platforms include, for example, ball bearing blocks slidably mounted on a pair of slide rails such as Thomson Slides, available from Thomson Industries, Mahasset, N.Y. Platform 70 is reciprocated by means of a ballnut 74 fixed to one end of platform 70 and lead screw 76 driven by servodrive 78 and belt 80. Similarly, platform 72 is reciprocated by means of a ball 82 fixed to one end of platform 72 and lead screw 84 driven by servodrive 86 and belt 88. Spindle 58 carries a rotatable cutting head 90 and spindle 60 carries a rotatable cutting head 92. Although each of these rotatable cutting heads are conventional, they carry at least one cutting tool having a polycrystalline diamond cutting surface for engagement with at least one end of the drum. The angle of the cutting tool surface varies depending upon the specific type of machining intended, e.g. chamfering, end cutting or counterboring. The expression "end cutting" as employed herein means machining an end of a drum to form a flat face (facing), the machined face being in a plane perpendicular to the imaginary axis of the drum. End cutting ensures that the drum length of the machined drum satisfies tolerances of predetermined drum length. The expression "counterboring" as employed herein means boring to a predetermined depth beginning at an end of the drum, the centerlines of the counterboring and drum being substantially parallel. Also, the number of polycrystalline diamond cutting tools carried by each rotatable cutting heads can vary, for example, from 1 to about 5. The rotatable cutting heads 90 and 92 may carry a plurality of polycrystalline diamond end cutting tools, a plurality of polycrystalline diamond chamfering tools and/or a combination of one and/or more polycrystalline diamond end cutting tools and one and/or more polycrystalline diamond chamfering tools. The polycrystalline diamond cutting tools may be mounted to the rotatable cutting heads by any suitable and conventional technique such as with recess and set screw combinations, insert cartridges (e.g. top clamp), and the like. The polycrystalline diamond end cutting (facing) tools, i.e., bits, are employed to ensure that the length of the drum precisely meets product tolerances whereas the polycrystalline diamond chamfering tools are employed to produce a chamfer (bevel) at the end of the drum to facilitate insertion of part of an end flange into the end of the drum during the flange mounting process. Thus, where the cuffing head carries an end cutting (facing) tool as well as a chamfering cutting tool, the end cutting tool is positioned further away from the end of the drum than the chamfering tool to optimize the formation of a bevel or chamfer.

As shown in FIG. 1, servo 86 has been activated to bring rotatable cutting head 92 of spindle 60 against one end of the drum secured in clamping vises 50. Preferably, the cutting head 92 is revolving continuously. Servodrive 78 is also activated to bring rotatable cutting head 90 of spindle 58 against the other end of the drum while the drum remains secured in clamping vises 50. The servos 86 and 78 are preferably activated simultaneously. If desired, only one spindle may be employed to machine only one end of the drum. The other end of the drum may be machined at another time or not at all. Preferably, both ends of the drum are machined simultaneously with the cutting heads 90 and 92 being rotated in opposite directions. Such counter rotation counteracts the twisting force applied to the drum as compared to the twisting force applied when only one cutting head is employed. Since the twisting force applied to each end of the drums are counteracted by simultaneous use of counter rotating cutting heads, less gripping force is needed by the opposing jaws 54 and 56 and the likelihood of distortion of the drum is minimized during machining. Thus, it is preferred to simultaneously remove material from a first end of the drum (substrate) and a second end of the substrate with at least one polycrystalline diamond cutting tool moved in a circular path adjacent the first end of the substrate and at least one polycrystalline diamond cutting tool moved in a circular path adjacent the second end of the substrate. It is further preferred the circular path of the at least one polycrystalline diamond cutting tool moved adjacent the first end of the substrate is in a direction opposite the circular path of the at least one polycrystalline diamond cutting tool moved adjacent the second end of the substrate. The cutting heads 90 and 92, with spindles running, are set at a preset position (load position) until the drum is locked in the jaws 54 of clamping vices 50. The cutting heads 90 and 92 are then rapidly traversed at, for example, about 60 inches (152 centimeters) per second, to a rapid feed position immediately adjacent to drum ends. The cutting heads 90 and 92 are thereafter traversed at a slower rate, for example, about 2 inches (5 centimeters) to about 8 inches (20 centimeters) per second depending upon the drum size and materials, to an "end cut" position. A the end cut position, the cutting heads 90 and 92 are allowed to dwell, for example, for about 0.2 to about 1 second. Finally, the cutting heads 90 and 92 are returned to a load position to allow for removal of the machined drum and loading of a fresh drum to be machined.

Figure 5:
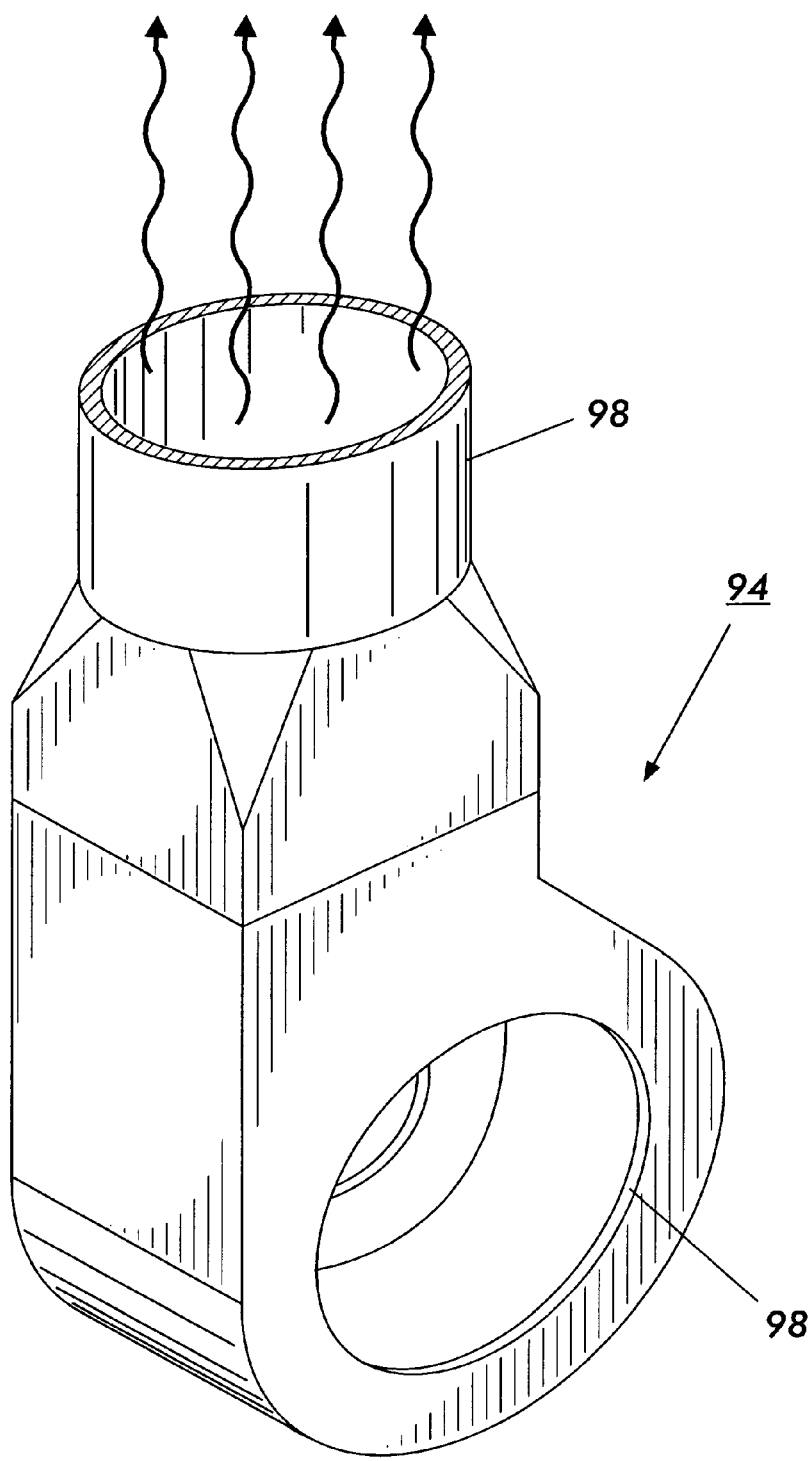
FIG. 5 is a partial schematic isometric view of a vacuum hood used in the machining apparatus shown in FIGS. 1, 2 and 3.

During machining, a vacuum housing 94 (see FIGS. 1, 2, 3, 4 and 5) encloses at least the end of the drum being machined and the rotating cutting heads 90 and 92. If desired, the housing 94 may enclosed the entire spindle 58 and 60 and even the spindle drive motors 62 and 64, respectively. Housing 94 is supported by the spindle 58 or 60 and or the horizontally slideable platform 70 or 72, respectively. An entry hole 96 (see FIG. 5) is provided in housing 94 to permit entry of one end of the drum when a cutting head, spindle and housing are collectively advanced toward the end of a fresh drum for the machining operation. An exhaust duct 98 connected to any suitable source of vacuum, such as a centrifugal fan or vacuum chamber (not shown), to continuously generate sufficient air flow during machining to remove the chips machined from the end of the drum by the polycrystalline cutting tool. In other words, sufficient air should be continuously flowing to carry away the material machined from the end of the drum. Typically, for a drum having about an 84 millimeter outside diameter, an air velocity of about 100 feet per second provides satisfactory results during chamfering. Lower velocities may be utilized for drums having an outside diameter less than about 84 millimeters and higher velocities may be employed for drums having an outside diameter greater than about 84 millimeters. Preferably, the air velocity through the vacuum hood is greater than about the velocity of the cutting tool. Thus, the cutting tool and portion of the drum (cylindrical substrate) contacted by the cutting tool are enclosed in a vacuum housing connected to a source of vacuum to continuously vacuum material machined from the at least one end of the substrate during the machining process.

The end cutting and chamfering operations are preformed in a dry environment free of any liquids such as cutting fluids or cooling baths. Build up of chips on the cutting edge of the polycrystalline cutting tools and deposits of chips within the interior of the drum during machining is avoided by the process of this invention. Thus, the interior surface of machined drums transported to the discharge station are free of chips and liquids and a washing step prior to lathing is eliminated.

After, machining, pneumatic cylinder 15 is activated to lower reciprocatable pick 17 to bring opposing clamps 20 of gripper 18 along each side of the machined drum. The horizontal pneumatic cylinders (not shown) supporting opposing clamps 21 of pick 17 are activated to bring opposing clamps 21 against the machined drum. Pneumatic cylinders 52 supporting jaws 54 of vises 50 are inactivated to retract the jaws 54 to the open position. Pneumatic cylinder 15 is then inactivated to retract pick 17 and the machined drum to an up position (see FIG. 4). While pick 17 is picking up the machined drum at the machining station, pick 16 is picking up a fresh drum at the loading station.

Pneumatic traverse cylinder 28 is activated to horizontally move reciprocatable pick 17 toward a discharge station and reciprocatable pick 16 toward the machining station. Placement of a fresh drum into vises 50 at the machining station has already been described above. At the discharge station, air cylinder 15 is activated to lower pick 17 and the machined drum into a suitable discharge device such as a hopper or conveyor belt (not shown). The horizontal pneumatic cylinders (not shown) supporting opposing clamps 21 of pick 17 are inactivated to withdraw opposing clamps 21 away from the drum and pneumatic cylinder 15 is thereafter inactivated to retract pick 17 to an up position. Next, pneumatic traverse cylinder 28 is activated to horizontally and simultaneously move reciprocatable pick 17 back to the machining station and pick 16 back to the loading station to repeat the cycle of picking up a fresh drum at the loading station, transporting it to the machining station and finally transporting the machined drum to the discharge station. Thus, the process of this invention preferably includes machining at least a portion of at least one end of a drum (substrate) with at least one dry polycrystalline diamond cutting tool at a machining station and, after completion of the machining to form a machined drum, transporting the machined drum to a discharge station while simultaneously transporting a fresh drum to the machining station for machining. Although simultaneous horizontal movement of picks 16 and 17 are preferred, sequential movement may alternatively be employed using a separate traverse cylinder for each pick. In still another alternative embodiment, a single pick could be used for transporting fresh drums from the loading station to the machining station and machined drums from the machining station to the discharge station. This latter embodiment is less desirable because it results in slower throughput. Since the interior surface of machined drums transported to the discharge station are free of chips and liquids, the machined drums are taken in a dry state free of chips in the interior of the machined drum directly to the next processing station such as a lathing station (not shown) without a washing step.

Any other suitable reciprocatable drive means may be substituted for any of the two way acting pneumatic cylinders such as, for example pneumatic cylinders 14, 28, 44, 48 and the like. Typical reciprocatable drive means include ball and lead screw, magnetic reciprocating drive system, servomotor, and the like.

Although a belt drive for the spindle is illustrated, other suitable drive systems may be employed. Other typical drive systems include, for example, hydraulic drives, gear drives, and the like. Typical machining devices including spindles driven by electric motors are commercially available from, for example, Westwind Airbearing, Bryant Symons or Olofsson.

The creation and removal of a pressurized fluid or vacuum to one end or the other of a two way acting pneumatic cylinder may be accomplished by activating any suitable solenoid operated valve. Conventional valve and electrical switch actuators may be utilized for the various pneumatic cylinders, motors, servos and the like in the machining apparatus subassemblies. Conventional solenoid operated valves are commercially available, for example, from Mac Valves, In., Wixom, Mich. Positive pressure, a vacuum or ambient air pressure may be supplied from any suitable conventional source by typical devices such as ordinary air coupling lines (not shown). The expression "vacuum" as employed herein is intended to mean a partial vacuum rather than a complete vacuum. Similarly, electrical power to drive electrical equipment such as motors, solenoids, servomotors, proximity or limit switches and the like are supplied through suitable wiring and conventional suitable electrical switching. The valve and switches are usually actuated through suitable circuitry in response to a signal from any suitable programmable controller. Expressions such as "activation", "activating" "supplying power", "inactivation", "inactivating" and the like are well known terms intended to include opening or closing solenoid operated valves or electrical switches to provide or discontinue providing positive pressure, a vacuum, ambient air pressure, electricity and the like. Thus, the control functions in the apparatus of this invention are preferably synchronized and integrated with a suitable programmable controller such as a Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate electric switches, solenoid operated valves that vent to the ambient atmosphere and or supply positive pressure to a two way acting pneumatic cylinder, and the like. Termination of an activated component may be effected by any suitable and conventional means such as by programmable controller or by suitable limit switches.

The expression "machine" as employed herein is defined as the removal of material an article by cutting. The cutting is performed with a cutting tool such as a bit.

Figure 6:
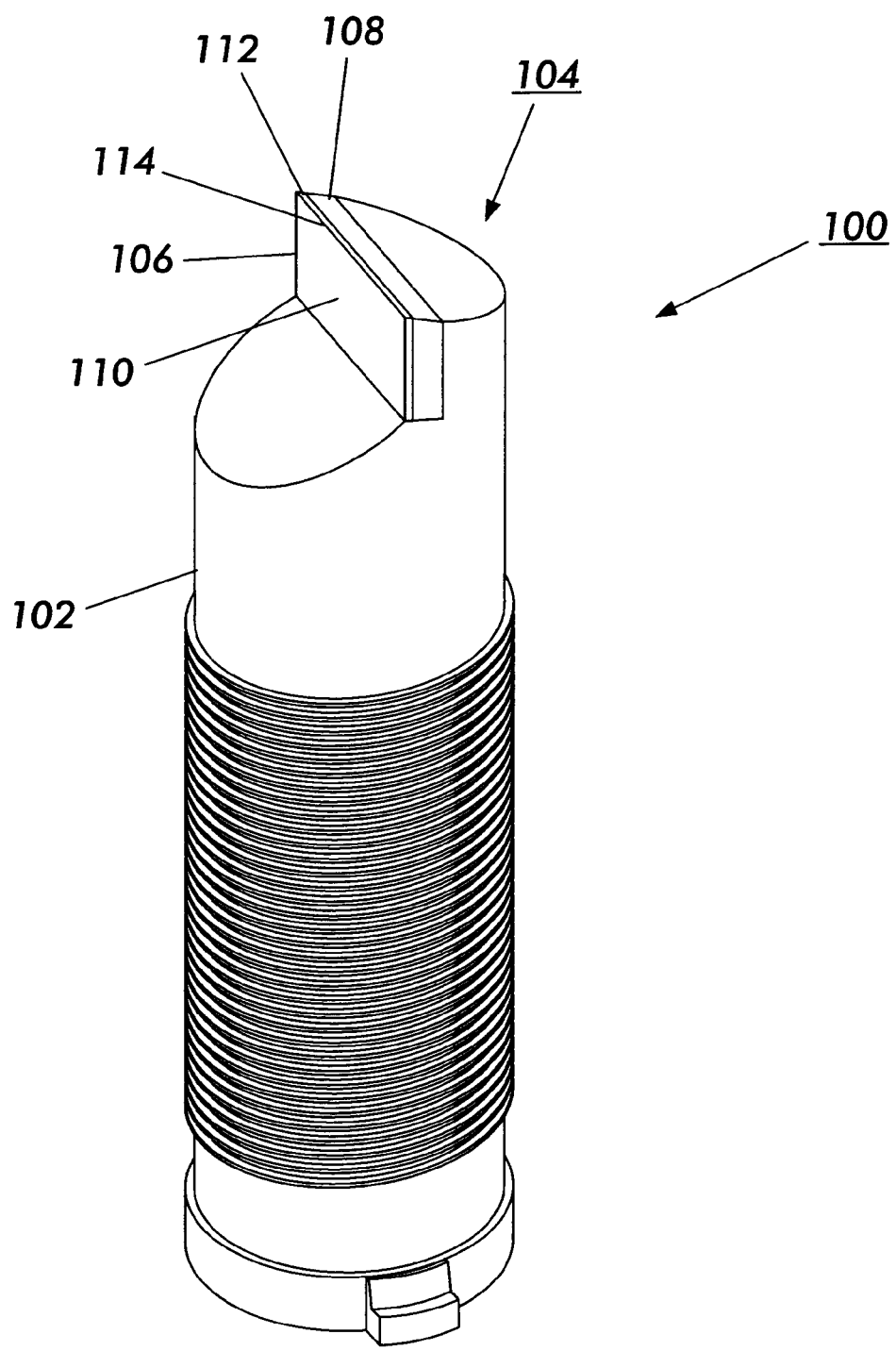
FIG. 6 is a schematic isometric view of a polycrystalline diamond cutting tool used in the machining apparatus shown in FIGS. 1, 2, 3 and 4.

Shown in FIG. 6 is an embodiment of a cutting tool 100 for the machining process of this invention. Tool 100 comprises a body 102 having a cutting end 104. The cutting end 104 comprises a polycrystalline diamond cutting layer 106 bonded to an optional intermediate layer 108. Any suitable material may be employed in the intermediate layer 108. The intermediate layer 108 is bonded to body 102. Any suitable material may be used in the body 102. If desired, polycrystalline diamond cutting layer 106 may be bonded directly to body 102.

Thus, the process of this invention utilizes a cutting tool for machining the end region of a hollow cylindrical substrate, i.e., drum, including, for example, cutting at least one end of the drum, chamfering at least one end of the drum or boring the inside edge at an end of a drum, the cutting tool comprising a cutting surface comprising polycrystalline diamond material. Generally, for reasons of economy, the cutting surface of polycrystalline diamond material is in the form of a thin layer bonded to a supporting member. Bonding may be assisted by any suitable material such as cement or brazing. The supporting member may be any suitable single component member or a composite of two or more segments. For example, a body may comprise a tool steel body, a carbide segment adjacent the cutting end of the tool, and a polycrystalline diamond layer. A preferred composite supporting member comprises a tool steel body bonded to a thin tungsten carbide intermediate layer which is bonded to a polycrystalline diamond layer. Typical supporting body materials include, for example, tool steel, stainless steel, and the like. If desired, the polycrystalline diamond layer may be bonded directly to the supporting body.

Any suitable and conventional cutting shape may be employed at the end of the cutting tool. The specific shape depends upon the depth and angle of cutting desired as well as the configuration of the tool mount in the many commercially available rotating cutting heads available for use in the machining process of this invention. Different shapes are utilized depending on the angle that the cutting tool is positioned during end cutting, chamfering or boring. For example, typically, a triangular shape is employed for end cutting, a squared shape is used for chamfering and a triangular shape is utilized for boring. Typical rotatable cutting heads are commercially available, for example, from TSD Microbore and Jasco Tool. Preferably, regardless of the type of drum end machining selected, the cutting edge of the tool at the point, where it contacts the work to be machined, is straight and the two sides of the polycrystalline layer, which join to form the cutting edge, form an angle between about 5 and about 20 degrees relief when the cross section of the cutting edge is viewed in a direction parallel to the cutting edge. The two sides 110 and 112 which form the cutting edge 114 illustrated in FIG. 6, form an angle of about 90 degrees. Generally, the cutting tool has a cutting edge comprising a sharp corner of a straight run along the surface of the polycrystalline diamond cutting surface. The main body of the cutting tool may be of any suitable shape that facilitates mounting of the tool in a conventional machining tool holding device. Generally, the cutting edge is aligned perpendicular to the imaginary axis of the drum and parallel to an imaginary drum radius during an end machining operation to cut the drum to a predetermined length. For chamfering machining, the cutting edge is preferably aligned between about 30° and about 60° to the imaginary axis of the drum and preferably between about 30° and about 60° to an imaginary drum radius during machining to form a bevel at at least one end of the drum. The angle of the cutting tool during the cutting operation should be sufficient to avoid contact of the supporting cutting tool structure with the drum being machined. Generally, satisfactory results are achieved with a cutting head rotational speed between about 1,500 revolutions per minute and about 5,000 revolutions per minute. However, rotational speeds outside of this range may be utilized so long as the objectives of this invention are met. Thus, for example, larger diameter drums may be machined at a lower rpm than small diameter drums. Preferably initial machining of the end of a drum is conducted with a polycrystalline diamond cutting tool set at a nominal cutting advancement speed of between about 2 inches (50 millimeters) per minute and about 6 inches (150 millimeters) per minute. The expression "nominal cutting advancement speed" as employed herein is defined as the rate of advancement of the cutting head toward the end of the drum. Cutting depths greater than about 8 (203 millimeters) per minute can cause undesirable overheating of the drum or gouging of the drum surface. Advancement of the cutting head is terminated at a point where the drum has been reduced in length to a predetermined length tolerance. At the point of termination of cutting head advancement, the rotating cutting head is briefly held in place prior to retraction to ensure that a smooth machined surface has been formed at the end of the drum. To achieve a precise machined surface, it is preferred that during machining, material removal is continuous and uninterrupted.

Prior to drum machining, the inner exposed surface of the drum substrate should be cleaned to remove all particulate material present. Removal of all foreign material from the interior of the hollow cylindrical drum interior facilitates processing during and after machining the ends of the drum. Removal of foreign material from the interior of the hollow cylindrical drum interior may be achieved by any suitable method. Typical cleaning includes, for example washing, with or without brushes or scrapers, and the like.

The polycrystalline diamond material comprises diamond particles grown or sintered together. Thus, most of diamond particles are in substantial diamond to diamond contact with each other. Preferably, the diamond particles are in intimate contact with each other over at least about 70 percent of their outer surfaces. Optimally, the area (or volume fraction) of intimate contact between diamond particles is at least about 95 percent of the total. Sintering may be facilitated by any suitable bonding agent or solvent/catalyst metal. Typical diamond particle sizes may be, for example, between about 0.002 and about 500 micrometers in largest dimension although sizes outside of this range may be used where suitable. Usually, the diamond particles are synthetic diamond material. It is believed that natural diamond particle material having the same particle sizes can also be used.

Any suitable binder or solvent/catalyst metal may be utilized to bind the polycrystalline diamond particles together. Typical binders included, for example, cobalt, nickel, iron, ruthenium, palladium, osmium, iridium, platinum, chromium, manganese, titanium, tantalum, and the like and mixtures thereof. The polycrystalline diamond material is commercially available in various forms including layers bonded to one or more underlying support layers or bodies. It is also is available in sheets which can be cut, machined or ground into a suitable segment size which may be bonded to the cutting tip of cutting tools for engagement with the drum to be machined. Sheets of polycrystalline diamond material with or without a bonded backing are commercially available from, for example, from K&Y Diamond, Ltd., Montreal, Canada, De Beers Industrial Diamond Division (e.g., Syndite CTH 010 and Syndite CTH 025), Diamond Abrasives Corporation, General Electric Co. (Compax) and Sumitomo. The sheets of polycrystalline material are available in various thicknesses such as, for example 0.5 millimeter to 1.5 millimeters, although thicknesses outside of this range may be also be obtainable. The commercially available polycrystalline material bonded as a layer to a rigid support member such as tungsten carbide may in turn be bonded or cemented to a supporting tool body such as tool steel by any suitable technique such as silver brazing. The rigid support member may be preformed prior to attachment to the polycrystalline diamond material or formed simultaneously with the formation of the polycrystalline diamond material. In some embodiments involving simultaneous formation of the polycrystalline diamond material and supporting substrate, a transition layer comprising materials from the diamond layer and materials from the supporting substrate may also be formed. Generally simultaneous formation of the polycrystalline diamond material layer and supporting substrate is accomplished at very high pressures and temperatures of, for example, from about 1,300° C. to 1,600° C. at between about 50 kilobars and about 52.5 kilobars for several minutes for carbide and cobalt mixtures are employed, some of the being displaced into the diamond particles. The polycrystalline diamond layer may be of any suitable thickness. The thickness of the polycrystalline diamond segment should be sufficient to prevent supporting material of the bit from touching the drum surface being machined. The maximum thickness of the segment is limited by practical cost and space considerations. Moreover, the thickness of a polycrystalline material layer on a support is of sufficient thickness to ensure that the entire contacting cutting surface of the cutting tool which machines the drum is made up of the polycrystalline diamond material. Ideally, the relationship between the properties of the polycrystalline diamond layer and the underlying supporting member will be such that the edge of the polycrystalline diamond layer will wear away slightly less rapidly than the underlying supporting member. When this condition prevails a small amount of the diamond layer will continue to project beyond the cemented carbide support body to provide a cutting edge and the amount of diamond utilized will be commensurate with the life of the tool. Typical thicknesses for the polycrystalline diamond material layer are from about 13 micrometers to about 2,000 micrometers, although thicknesses outside of these ranges may be utilized so long as the objects of this invention are satisfied.

Techniques for preparation of members comprising polycrystalline diamond layers supported on a rigid member are well known and described, for example in U.S. Pat. No. 3,745,623, the entire disclosure thereof being incorporated herein by reference. The preparation of diamond compacts for use as the abrading elements in cutting and grinding tools wherein at least 50 percent by volume of the compact consists of diamond crystals is disclosed in U.S. Pat. No. 3,141,746, the entire disclosure thereof being incorporated herein by reference. Preferably, the diamond content in the polycrystalline layer is at least about 70 percent by volume and, optimally, the diamond content in the polycrystalline layer is between 90 and almost about 100 percent by volume, the contact being less than 100 percent because of the presence of binding material or solvent/catalyst. Since the polycrystalline diamond layer comprises self bonded or binder bound diamond particles disposed in random manner, the cleavage planes of the individual particles are also disposed in random manner to provide the polycrystalline diamond layer with greater resistance to fracture. Cutting tools having bonded polycrystalline diamond segments or layers may be obtained from any suitable source. Typical sources include, for example, K&Y Diamond Ltd., Montreal, Canada and Citco.

Surprisingly, the polycrystalline diamond cutting tool resists build up of chips on the cutting surfaces and cooperate with the vacuum removal device to prevent deposition of chips, such as particles and shavings, within the interior of the drum and accumulation of chips in the region of the drum being machined. This virtually eliminates defects from forming on the surface being machined and obviates the need for hand removal by a machine operator of chips adhering to the cutting tool. The polycrystalline diamond cutting tools appear to cut more cleanly, exhibit less friction, and generate less heat during machining.

It is believed that drum end cutting tools and chamfering tools having a carbide cutting surface tend to heat up the drum during machining and that this elevated temperature causes chips of machined material to adhere to the tool cutting surfaces. The adherence of chips to the tool cutting surfaces promotes tearing of the surface being machined. These undesirable characteristic are minimized by flooding the bit and drum surface being machined with cooling liquid and frequent manual removal of chips that are stuck to the cutting surface of the tool.

The drums being cut and chamfered may be of any suitable machineable non-ferrous material. Typical non-ferrous materials include, for example, non-ferrous metals and alloys thereof such as brass, bronze, silver, gold, copper, aluminum, magnesium, zinc; plastics, including reinforced plastics; graphite composites; carbon; hard rubber; and the like. The hardness of these non-ferrous materials are less than the hardness of ferrous materials. The ends of hollow drums of any suitable diameter may be machined by the process of this invention. Typical drum outside diameters for electrostatographic imaging members range from about 15 millimeters to about 100 millimeters. Typical wall thicknesses for hollow electrostatographic imaging member drums have a wall thickness of between about 0.03 inch (0.7 millimeters) and about 0.5 inch (13 millimeters).

The machined drums may be utilized as substrates in electrostatographic imaging members (e.g., photoreceptors and electrographic drums). These imaging members are well known in the art. The electrostatographic imaging members may be prepared by various suitable techniques. Typically, a substrate provided by this invention has an electrically conductive surface. At least one photoconductive layer is then applied to the electrically conductive surface. An optional thin charge blocking layer may be applied to the electrically conductive surface prior to the application of the photoconductive layer. For multilayered photoreceptors, a charge generation layer is usually applied onto the blocking layer and charge transport layer is formed on the charge generation layer. For single layer photoreceptors, the photoconductive layer is a photoconductive insulating layer and no separate, distinct charge transport layer is employed. For the sake of simplification, the various coatings applied to the substrate to form an electrophotographic imaging member will be referred to collectively herein as "at least one electrophotographic imaging layer".

Any suitable size drum may be machined with the process of this invention. Examples of drum diameters include, for example, diameters of about 30 millimeters, 40 millimeters, 85 millimeters, and the like. Preferably, the outer surface of the drum being coated is smooth. However, if desired, the drum may be slightly roughened by honing, sand blasting, grit blasting, rough lathing, and the like. Such slight roughening forms a surface which varies from the average diameter by less than about plus or minus 8 micrometers. The surface of the drum being coated is preferably inert to the components in the liquid coating materials applied. The drum surface may be a bare, uncoated surface or may comprise the outer surface of a previously deposited coating or coatings. The substrate may comprise numerous suitable materials having the required mechanical properties. Accordingly, the substrate may comprise a layer of an electrically non-conductive or conductive material such as an inorganic or an organic composition. As electrically non-conducting materials there may be employed various thermoplastic and thermosetting resins known for this purpose including, for example, polyesters, polycarbonates, polyamides, polyurethanes, and the like. Typical metal substrates include, for example, aluminum, nickel, brass, and the like. The electrically insulating or conductive substrate should be rigid and in the form of a hollow cylindrical drum. Preferably, the substrate comprises a metal such as aluminum.

The conductive layer, if a separate layer is employed, may vary in thickness over substantially wide ranges depending on the optical transparency desired for the electrostatographic member. Accordingly, the conductive layer and the substrate may be one and the same or the conductive layer may comprise a coating on the substrate. Where the conductive layer is a coating on the substrate, the thickness of the conductive layer may be as thin as about 30 Angstroms, and more preferably at least about 100 Angstrom units for optimum electrical conductivity. The conductive layer may be an electrically conductive metal layer formed, for example, on the substrate by any suitable coating technique, such as a vacuum depositing technique or tribo adhesion. Typical metals include aluminum, zirconium, niobium, tantalum, vanadium and hafnium, titanium, nickel, stainless steel, chromium, tungsten, molybdenum, and the like. Typical vacuum depositing techniques include sputtering, magnetron sputtering, RF sputtering, and the like.

Regardless of whether a conductive metal layer is the substrate itself or a coating on the substrate, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. The conductive layer need not be limited to metals. Other examples of conductive layers may be combinations of materials such as conductive Indium tin oxide or carbon black loaded polymer. A typical surface resistivity for conductive layers for electrophotographic imaging members in slow speed copiers is about 1 02 to 103 ohms/square.

After formation of an electrically conductive surface, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. Typical blocking layers include, for example, polymers, siloxanes, titanates, and the like. The blocking layer should be continuous and have a thickness of less than about 0.2 micrometer because greater thicknesses may lead to undesirably high residual voltage. Drying of the deposited coating may be effected by any suitable conventional technique such as oven drying, infra red radiation drying, air drying and the like.

Any suitable photogenerating layer may be applied to the blocking layer. Examples of typical photogenerating layers include inorganic or organic photoconductive particles dispersed in a film forming binder. Generally, the average particle size of the particles dispersed in the charge generating layer is less than about 1 micrometer. A preferred average size for pigment particles is between about 0.05 micrometer and about 0.2 micrometer.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference.

Any suitable solvent may be employed to dissolve the film forming binder. Satisfactory results may be achieve with a pigment to binder weight ratio of between about 40:60 and about 95:5.

Various factors affect the thickness of the deposited charge generating layer coating. These factors include, for example, the solids loading of the total liquid coating material, the viscosity of the liquid coating material, and the relative velocity of the liquid coating material in the space between the drum surface and coating vessel wall when dip coating is employed. Satisfactory results are achieved with a solids loading of between about 2 percent and about 12 percent based on the total weight of the liquid coating material; the "total weight of the solids" being the combined weight of the film forming binder and pigment particles and the "total weight of the liquid coating material" being the combined weight of the film forming binder, the solvent for the binder and pigment particles. The thickness of the deposited coating varies with the specific solvent, film forming polymer and pigment materials utilized for any given coating composition. For thin coatings, a relatively slow drum withdrawal (pull) rate is desirable when utilizing high viscosity liquid coating materials. Generally, the viscosity of the liquid coating material varies with the solids content of the liquid coating material. Satisfactory results may be achieved with viscosities between about 1 centipoise and about 100 centipoises.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

Any suitable and conventional technique may be utilized to dry the deposited coating. Typical conventional techniques include, for example, oven drying, infra red radiation drying, air drying and the like. After drying, the deposited charge generating layer thickness generally ranges in thickness of from about 0.1 micrometer to about 5 micrometers, and preferably between about 0.05 micrometer and about 2 micrometers. The desired photogenerating layer thickness is related to binder content. Higher binder content compositions generally require thicker layers for photogeneration. Thicknesses outside these ranges can be selected providing the objectives of the present invention are achieved.

The active charge transport layer may comprise an activating compound useful as an additive dispersed in electrically inactive polymeric materials render these materials electrically active. These activating compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. A typical transport layer employed in one of the two electrically operative layers in multilayered photoconductors comprises from about 25 percent to about 75 percent by weight of at least one charge transporting aromatic amine compound, and about 75 percent to about 25 percent by weight of a polymeric film forming resin in which the aromatic amine is soluble.

Any suitable inactive resin binder soluble in methylene chloride or other suitable solvent may be employed in the charge transport layer. Molecular weights can vary, for example, from about 20,000 to about 150,000.

Any suitable and conventional technique may be utilized to mix the charge transport layer coating mixture. A preferred coating technique utilizes dip coating. Various factors affect the thickness of the dip deposited charge transport layer coating. These factors include, for example, the solids loading of the total liquid coating material, the viscosity of the liquid coating material, and the relative velocity of the liquid coating material in the space between the drum surface and coating vessel wall. Satisfactory results are achieved with a solids loading of between about 40 percent and about 65 percent based on the total weight of the liquid coating material; the "total weight of the solids" being the combined weight of the film forming binder and the activating compound and the "total weight of the liquid coating material" being the combined weight of the film forming binder, the activating compound and the solvent for the binder and activating compound. The thickness of the deposited coating varies with the specific solvent, film forming polymer and activating compound utilized for any given coating composition. For thin coatings, a relatively slow drum withdrawal (pull) rate is desirable when utilizing high viscosity liquid coating materials. Generally, the viscosity of the liquid coating material varies with the solids content of the liquid coating material. Satisfactory results may be achieved with viscosities between about 100 centipoise and about 1000 centipoises. Drying of the deposited coating may be effected by any suitable conventional technique such as oven drying, infra red radiation drying, air drying and the like.

Generally, the thickness of the hole transport layer is between about 1 0 to about 50 micrometers after drying, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Optionally, an overcoat layer may also be utilized to improve resistance to abrasion. Overcoatings are continuous and generally have a thickness of less than about 10 micrometers.

PREFERRED EMBODIMENT OF THE INVENTION

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

In a control example, the ends of drums were chamfered with machining apparatus enclosed in a housing fitted with a sliding safety door. The door was manually opened and an aluminum drum having an outside diameter of 84 millimeters, a thickness of 1.25 millimeters and a length of 342 millimeters was manually mounted in a clamping fixture. Mounting of the drum involved manual placement of the drum into the fixture and sliding the drum against a stop arm. Manual closing of the safety door automatically initiated clamping of the drum in the fixture by means of hydraulic power to secure the drum in the fixture and hold the drum stationary. Adjacent to each end of the drum were moveable spindles, each carrying a rotatable cutting head. Each cutting head carried 3 active cutting tools with tungsten carbide tips, one for chamfering the outside edge at the end of the drum, one for chamfering the inside edge of the end of the drum, and one for cutting the face of the end of the drum to conform the length of the drum to a predetermined size. After the drum was secured in the fixture, electric motors were automatically activated to initiate rotation of the cutting heads and spindles. As the electric motors came up to speed (ultimately driving the cutting heads at a speed of 2,560 rpm), the cutting heads were automatically advanced toward the drum ends in an initial "rapid feed" mode to a preset position and thereafter advanced at a slower feed rate for cutting. As the heads were advanced at the cutting rate, cutting fluid was pumped through ports in the cutting heads and onto the ends and interior of the drum. At the end of the cutting operation, the cutting heads were automatically retracted, the motors were stopped, brakes were engaged and the fixture was opened. The safety door was manually opened, the machined drum was manually removed, and a fresh drum was placed into the fixture for the next machining cycle. After the machined drum was manually removed from the machining apparatus housing, it was manually placed on a drip table to allow the cutting fluid to drain from the drum. After a period of time, the drum was placed in a washer where the cutting fluid was washed away by water. The drum was thereafter manually placed on a drying deck where most of the water from the washer treatment has drained away from the drum. The constant opening and closing of the door for each drum led to low throughput and operator tendonitis problems. Moreover, contact with the wet chamfered drum often led to dermatitis on the part of the machine operator. The entire area around the door including the floor was damp. Examination of the interior of the drum removed from the machining apparatus housing revealed that it was wet with cutting fluid and that it also contained chips of aluminum generated by the machining operation. If the cutting fluid and chips from the chamfering and facing operation were not removed from the interior of the drum, they contaminated coating baths during subsequent coating operations. The contaminated coating baths led to defects in the coatings and the coating operation had to be shut down to replace the contaminated coating material. Thus, a hot water wash was necessary to clean the interior of the chamfered drums. The washing operation created a mist which required captured to prevent it from contaminating other operations or soaking the operator. A drying step was also necessary to remove the washing liquid. The carbide cutting tool required frequent sharpening. Sharpening of the carbide cutting tool required shut down of the chamfering operation, removal of the tool, sharpening of the tool, and reinstallation of the tool. In this chamfering operation with carbide cutting tools, the operator was also required to periodically manually remove chips from the cutting bits during the cutting operation to prevent gouging and tool damage. With this machining, washing and drying process, about 900 drums could be machined, cleaned and dried in an 8 hour period.

EXAMPLE II

The procedures described in Example I were repeated with another identical drum substrate except that the machining operation was conducted with apparatus similar to the apparatus illustrated in FIGS. 1–6. Drums were manually loaded into a hopper which automatically fed fresh drums to a reciprocatable lifting cradle which raised each drum upwardly. A positioner pushed the drum against a stop while the drum rested in the cradle to ensure drum positioning. A reciprocatable pick conveyed the drum to clamping vises. Slidable spindles carrying rotatable cuffing heads were positioned adjacent each end of the drum. Each cutting head carried 3 active polycrystalline diamond cutting tools (available from K&Y Diamond) cutting tools, one for chamfering the outside edge at the end of the drum, one for chamfering the inside edge of the end of the drum, and one for cutting face of the end of the drum to conform the length of the drum to a predetermined size. The polycrystalline diamond cutting tools comprised a polycrystalline layer having a thickness of about 0.432 millimeter on a tungsten carbide layer having a thickness of about 1.168 millimeters on a support of tool steel. After the drum was stationary in the clamping vises, the rotating cutting heads were simultaneously brought into contact with each end of the drum by sliding the spindle with the aid of a ballnut and screw drive. Each of the cutting heads were driven by electric motors at a speed of 3,500 rpm. Contact between the end of the drum and the polycrystalline diamond cutting tools carried by the rotating cutting head removed material from the drum to chamfer the drum ends. The cutting heads were rotated in opposite directions during machining to counteract any tendency of the drum to twist in the clamping vises. During machining, each cutting head and drum end were enclosed in a vacuum housing which was connected through an exhaust duct to a source of partial vacuum. Each housing was supported by the slidable spindles and each housing had an entry hole which accommodated entry the adjacent end of the drum as the spindle and housing was slid toward the end of the drum. The entry hole had a diameter that was slightly larger than the outside diameter of the drum to prevent contact between the housing and the drum. The duct had an inside diameter of about 3 inches (76 millimeters). The partial vacuum source created an air velocity through the duct of 100 feet per second. This velocity at least as fast as the velocity of the cutting tools. This chamfering operation was conducted in a dry environment completely free of any liquids. After completion of chamfering, the slidable spindles were retracted away from the drum ends and the reciprocatable pick conveyed the drum from the clamping vises to a discharge station. Movement of the hopper drum feed, lifting cradle, positioner, pick, clamping vises and slidable spindles were controlled by a controller (SCL5/03, from Allen Bradley) which activated or inactivated valves, servos, two way acting pneumatic cylinders, switches and other devices in a predetermined timing sequence. During chamfering, no build up of chips on the cutting edge of the polycrystalline cutting tools were observed. Also, examination of the drums at the discharge station failed to reveal any deposits of fluids or chips within the interior of the drum. Thus, the interior surface of machined drums transported to the discharge station were free of chips and liquids and a washing step prior to lathing was completely eliminated. With the machining process of this invention, about 2,400 drums were machined in an 8 hour period. This was a 166 percent improvement over the process of Example I. Moreover, tendonitis, dermatitis, washing, drying, shut down, cleaning of tools and coating bath contamination problems of Example I were also eliminated with the machining process of this invention.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process comprising
providing a hollow cylindrical substrate, the substrate having a dry outer surface describing a curvilinear plane, a dry inner surface describing a curvilinear plane, a first end opposite a second end, and an imaginary axis extending from the first end to the second end;
supporting the substrate;
machining at least a portion of the end of the substrate with a dry polycrystalline diamond cutting tool situated near the end of the substrate and in the absence of liquids to liberate machined debris material from the substrate; and
simultaneously maintaining, during machining, the dry inner surface of the cylindrical substrate free of the liberated machined debris by continuously flowing sufficient air to carry away the liberated machined debris from the substrate, wherein the sufficient air flow is accomplished by continuously vacuuming the liberated machined debris from the machined substrate, and wherein the cutting tool and the portion of the cylindrical substrate contacted by the cutting tool are enclosed in a vacuum housing connected to a source of vacuum.

2. A process according to claim 1 including removing material with a plurality of polycrystalline diamond tools from at lease end of the substrate.

3. A process according to claim 1 including removing the material with the at least one polycrystalline diamond tool to form a chamfered surface at the first end of the substrate.

4. A process according to claim 1 including simultaneously removing the material with at least two polycrystalline diamond tools to form a chamfered surface at the first end of the substrate and at the second end of the substrate.

5. A process according to claim 1 including removing the material with the at least one dry polycrystalline diamond tool at the first end of the substrate to reduce cylindrical substrate length.

6. A process according to claim 1 including simultaneously removing the material with at least two polycrystalline diamond tools at the first end of the substrate and at the second end of the substrate to reduce cylindrical substrate length.

7. A process according to claim 1 the including removing material with the polycrystalline tool from the interior of the cylindrical substrate adjacent at least the first end of the cylindrical substrate to form a counterbore.

8. A process according to claim 1 wherein the polycrystalline tool comprises a support and a cutting surface, the cut surface comprising polycrystalline diamond particles.

9. A process according to claim 8 wherein the cutting surface comprises a layer of polycrystalline diamond particles bonded to a support body.

10. A process according to claim 9 wherein the support body comprises a metal.

11. A process according to claim 1, wherein the hollow cylindrical substrate remains stationary while the tool moves on a circular path around the substrate during machining.

12. A process according to claim 11, wherein the tool's circular movement is at a first velocity and the air is continuously flowed at a second velocity where the second velocity is greater than the first velocity of the tool movement.

13. A process according to claim 1 wherein the at least a portion of at least one end of the substrate contacted with at least one dry polycrystalline diamond cutting tool comprises a nonferrous material.

14. A process according to claim 1 wherein the at least a portion of at least one end of the substrate contacted with at least one dry polycrystalline diamond cutting tool comprises aluminum.

15. A process according to claim 1 including machining at least a portion of at least one end of the substrate with at least one dry polycrystalline diamond cutting tool at a machining station and, after completion of the machining to form a machined substrate, transporting the machined substrate to a discharge station while simultaneously transporting a fresh substrate to the machining station for machining.

16. A process according to claim 1, wherein the machining removes material from the both ends of the substrate with at least two diamond cutting tools, one at each end, moving in same circular path and same rotational direction, and adjacent to the respective ends of the substrate.

17. A process according to claim 16, wherein the circular path of the tools is the same and the rotational direction of the tools at opposite ends is opposite.

* * * * *